D. A. SELIGMAN.
FRUIT AND VEGETABLE PEELER AND SLICER.
APPLICATION FILED MAY 20, 1909.
991,097.
Patented May 2, 1911.
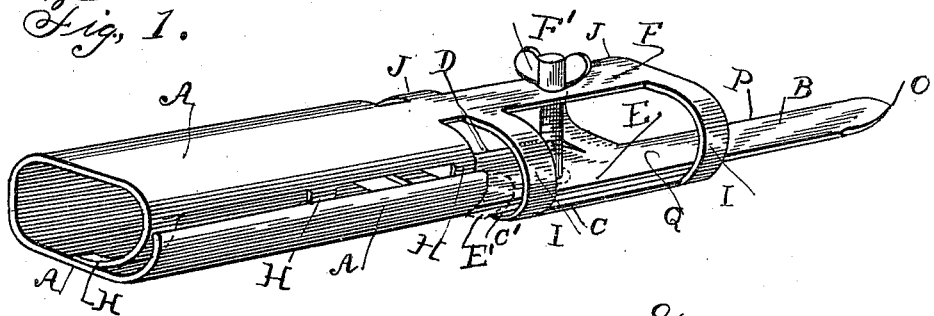
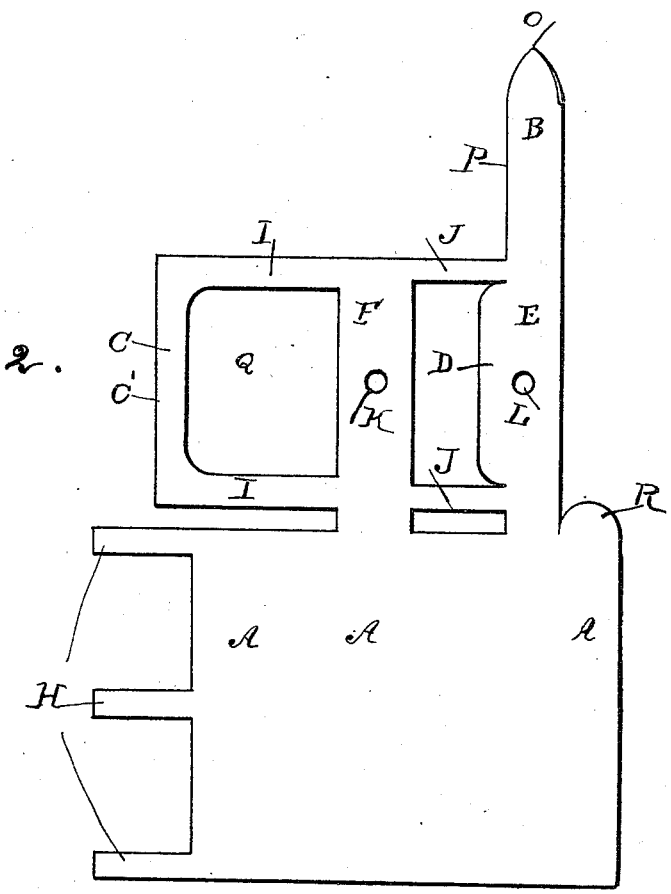
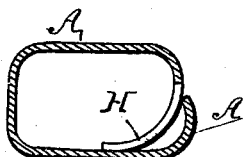
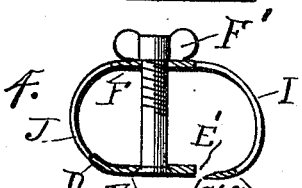

UNITED STATES PATENT OFFICE.

DAVID A. SELIGMAN, OF ST. JOSEPH, MISSOURI.

FRUIT AND VEGETABLE PEELER AND SLICER.

991,097.            Specification of Letters Patent.        Patented May 2, 1911.

Application filed May 20, 1909. Serial No. 497,325.

*To all whom it may concern:*

Be it known that I, DAVID A. SELIGMAN, a citizen of the United States, residing at St. Joseph, in the county of Buchanan and State of Missouri, have invented certain new and useful Improvements in Fruit and Vegetable Peelers and Slicers, of which the following is a specification.

The object of my device is to provide a knife especially adapted to peel all kinds of soft fruit and vegetables so as to save the most of the same and that can also be used to slice fruit or vegetables to any thickness required.

I accomplish my object by the mechanism illustrated in the accompanying drawings, in which, Figure 1 is a perspective view of the entire device; Fig. 2 is an outline of the entire device shown cut from a sheet of metal before being bent into the form shown in Fig. 1; Fig. 3 is a cross section of the handle and spring fingers and Fig. 4 is a cross section showing the construction of the peeler blade, set screw, guide and rest.

Similar letters refer to similar parts in the several views.

A is a handle for a cutting blade B and for a peeling blade C; it also serves as a handle for a guide D, a rest E and a set plate F. The edge of this guide D is curved upwardly to form a lip, as best shown in Fig. 4. This curved edge or lip guides the main blade or rest E smoothly over the article to be pared or sliced, without digging thereinto when it is desired that only the sharp edge of the blade C shall operate.

C' is the sharp edge of blade C.

Blade B is for ordinary cutting purposes and is integral with rest E.

F' is a set screw its upper end threaded, its lower end unthreaded and riveted.

E', as shown in Fig. 4 is the relative normal spaced distance between peeling blade C and rest E.

H H are spring fingers.

J J are spring strips connecting set plate F and cutting blade B. I I are overhanging spring arms connecting the opposite edge of said set plate F with peeling blade C, holding said blade in a somewhat stiff position, at the same time allowing some elasticity to the same.

K is a threaded hole in set plate F in which the upper threaded end of set screw F' operates and L in rest E is a concave hole for anchoring the lower unthreaded end of said set screw. Said space E' is for the purpose of allowing the peel or slices to drop freely off blade C.

O is a pointed end of cutting blade B for boring out bad places in fruit or vegetables.

P is the sharpened edge of blade B.

Q is a cut out portion of the metal between blade handle A and the lower ends of spring strips I I to allow for greater elasticity to the lower ends of said spring strips.

R is a shield for the fingers; it is shown in Fig. 2 but is broken away and shown in dotted lines only in Fig. 1 in order to permit the end of the peeler blade being seen.

Set screw F' regulates the cutting depth of blade C. Said set screw can, however, be dispensed with, in which case it is only necessary to press handle A; by this pressure peeling blade C is lowered and space E' is increased according to the degree of pressure on the handle.

I have shown the paring knife supported on resilient or yieldable arms formed integral with the lower or cutting edge of the knife blade, but I do not restrict myself to this construction, as any suitable means of attaching the paring blade to the main knife blade may be employed within the limits of mechanical skill without departing from the spirit and scope of my invention, one of the essential features of my invention being the extending of the working edge of the paring blade over the back edge of the main blade and beyond the plane of said blade whereby the flat surface of said main blade serves as a convenient guide for operating said paring blade.

Another feature of the invention is the simple manner by which the paring blade may be adjusted to regulate its depth of cut and by which adjustment said paring blade may be readily changed into a slicer when desired.

My improved paring and slicing knife is extremely simple and inexpensive in construction and most effective in its operation.

What I claim and desire to secure by Letters Patent is:—

1. A vegetable peeler and slicer comprising a blade having a portion of one edge sharp and another portion of said edge blunt and curved upwardly, the other edge of said blade being blunt, a peeling blade parallel with and located behind a portion of the blunt edge of the first-mentioned blade and yieldingly carried by said first mentioned blade, and an adjusting screw for varying the distance between the said peeling blade and the blunt edge of the first mentioned blade.

2. As a new article of manufacture, a knife comprising a main blade having a suitable manipulating handle, a paring and slicing blade, means for supporting said latter blade on said main blade, said supporting means being arranged to extend from the cutting edge of said main blade across one face thereof and to overhang its back edge, and means whereby the working edge of the paring blade may be caused to extend the desired distance beyond the plane of the opposite face of said main blade.

3. A fruit and vegetable peeler stamped from a single piece of metal comprising a handle, a cutting blade, a peeling blade, a rest, a guide for said peeling blade and spring strips and arms forming connection between the handle and blades, substantially as described and shown.

4. In a fruit and vegetable peeler and slicer a spring handle, a spring blade, a set screw to regulate the same, a guide for leading the blade across the surface of the fruit or vegetable to a position overhanging the rear of the guide to either peel or slice the desired thickness substantially as set forth and shown.

5. A fruit and vegetable peeler comprising a handle, a cutting blade, a peeling blade, a guide, a concave rest spaced from said peeling blade, and having a hole therein, a set plate provided with a threaded hole, a set screw threaded at its upper end to operate in said threaded hole to lower or elevate the peeler blade for peeling or slicing the lower unthreaded end of said set screw being anchored in said hole in the concave rest, substantially as set forth and shown.

6. In a fruit and vegetable peeler and slicer a compressible handle, a stamped part thereof forming spring strips and an upwardly turned rest spaced between said strips, a set plate connecting said strips, duplicate spaced spring arms connected with the opposite edge of said set plate and a peeler blade carried forwardly by the opposite turned ends of said arms its edge spaced on a horizontal slightly below that of the back of the handle, substantially as shown and described.

In testimony whereof I affix my signature in presence of two witnesses.

DAVID A. SELIGMAN.

Witnesses:
Wm. B. Snyder,
Pearl St. Clair.

---

Copies of this patent may be obtained for five cents each, by addressing the "Commissioner of Patents, Washington, D. C."